(12) United States Patent
Nivens et al.

(10) Patent No.: US 6,771,929 B1
(45) Date of Patent: Aug. 3, 2004

(54) SATELLITE COMMUNICATION SYSTEM THRESHOLD LEVELING TECHNIQUES

(75) Inventors: Dennis A. Nivens, Hermosa Beach, CA (US); David A. Wright, Hermosa Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 741 days.

(21) Appl. No.: 09/693,719

(22) Filed: Oct. 20, 2000

(51) Int. Cl.[7] ............................................. H04B 7/185
(52) U.S. Cl. ..................... 455/13.4; 455/12.1; 455/522; 370/316; 370/318
(58) Field of Search ............................. 455/12.1, 13.4, 455/68, 69, 70, 522; 370/316, 318, 332, 333

(56) References Cited

U.S. PATENT DOCUMENTS

| | | | |
|---|---|---|---|
| 4,910,792 A | | 3/1990 | Takahata et al. |
| 5,864,547 A | | 1/1999 | Strodtbeck et al. |
| 5,937,005 A | * | 8/1999 | Obuchi et al. ............... 375/224 |
| 6,085,067 A | * | 7/2000 | Gallagher et al. .......... 455/13.1 |
| 6,212,360 B1 | * | 4/2001 | Fleming et al. ............. 455/13.4 |
| 6,259,928 B1 | * | 7/2001 | Vembu ......................... 455/522 |
| 6,366,776 B1 | * | 4/2002 | Wright et al. ................ 455/427 |
| 6,430,418 B1 | * | 8/2002 | Nivens et al. ............... 455/522 |

* cited by examiner

Primary Examiner—William Trost
Assistant Examiner—Danh Le

(57) ABSTRACT

A method and apparatus for closed-loop power threshold leveling for a satellite communication system is provided. A preferred embodiment of the present invention includes a user earth terminal (UET) (140), a satellite (120) and a network control center (NCC) (110). The satellite (120) periodically determines an average error rate for data bursts transmitted by a plurality of UETs (140) and sends the average error rate as well as the number of transmitted data bursts to the NCC (110). The NCC (110) accumulates average error rates over a period of time, and when a predetermined number of data bursts has been surpassed, determines an uplink power threshold adjustment based on the average error rates. The NCC (110) then transmits the uplink power threshold adjustment to the satellite (120), which adjusts an on-board uplink power level threshold in response to the uplink power threshold adjustment. In systems using multiple beams, the satellite (120) maintains a separate uplink power level threshold for each beam, and determines a separate average error rate for each beam. The NCC (140) then determines and transmits a separate uplink power threshold adjustment for each beam. In systems using multiple coding levels, the satellite (120) determines separate error rates for each coding level, and the NCC (110) determines uplink power offset adjustment corresponding to each coding level. The NCC (110) then delivers the uplink power offset adjustments to the UETs (140), which update their local power offset values stored in memory.

11 Claims, 3 Drawing Sheets

SATELLITE COMMUNICATION SYSTEM THRESHOLD LEVELING TECHNIQUES

BACKGROUND OF THE INVENTION

The present invention generally relates to satellite communication systems. In particular, the present invention relates to controlling the uplink power in a satellite communication system.

Satellites have long been used to provide communication services to large regions of the globe. Historically, communication satellites have used frequencies in the range of 3 to 12 GHz (C or Ku band) to produce an antenna beam which covers a large portion of a continent. Modern satellites may operate at frequencies of 20 to 30 GHz (Ka band) to produce a beam which may cover an area (or "cell") with a diameter of 300 to 400 miles. Many such cells may be needed to provide communications to a region which previously may have been serviced by a single antenna beam. A modern cellular communication satellite may employ many antennas to generate a large number of beams used for transmitting downlink signals to, and receiving uplink signals from, various User Earth Terminals (UET) distributed over the surface of the earth.

In order for communication to occur on the uplink, signals generated by the UET must be of sufficient power to be received by the satellite. Thus, the antenna gain of the satellite's uplink antenna coupled with the transmission power of the UETs must be sufficient to allow communication to occur. Typically, communication satellite systems are designed with a predetermined, fixed satellite uplink antenna gain. Thus, the transmission power of the UET is typically controlled to enable and ensure communication.

In practice, several factors exists which may negatively impact the uplink communication channel. That is, certain undesired influences may cause the actual antenna gain to vary from the predetermined, designed antenna gain or may cause attenuation of, or interference with, a signal transmitted by a UET. For example, antenna gain may be affected by gain roll-off which may cause the antenna gain to vary spatially over the cell or, alternatively, antenna gain may vary over the cell as a result of pointing errors in the antenna. Atmospheric attenuation, also known as "rain loss," or interference among several UETs, also known as Co-Channel Interference (CCI), may also affect the quality of a signal transmitted from a UET. Each of these conditions, gain roll-off, antenna pointing errors, atmospheric attenuation, and CCI is further discussed below.

I . Gain Roll-Off

The pattern of cells on the surface of the earth is known as the cellular pattern of the satellite communication system. The cellular pattern in a modern satellite communication system may be defined on the surface of the earth such that the maximum gain of a satellite antenna beam is directed toward the center of its assigned cell. The boresight of a satellite antenna beam may be defined as the maximum gain point in the satellite antenna beam, and is typically directed to the center of a cell. The edge of a cell may be defined by determining the angular deviation from the antenna boresight at which the gain of the antenna beam- drops to a predetermined value below the maximum gain value, typically at least 3 dB below the maximum gain value. The decrease in antenna beam gain with increasing angular deviation from boresight is known as gain roll-off. In terms of uplink power, a communications signal which is transmitted to the satellite from a UET located at the edge of a cell may be received by the satellite antenna with a gain which is at least 3 dB lower than the gain of a signal which is transmitted from a UET located at the antenna boresight, or center of the cell. Thus, the transmission power level of a terminal located at the edge of a cell must be at least 3 dB higher than that of a terminal located at the center of a cell in order to achieve the same level of performance. In other words, if the edge of a cell is defined as the angle from boresight at which the satellite antenna gain has decayed to 3 dB below the maximum antenna gain at the boresight, a UET at the edge of the cell may need to use a transmission power level 3 dB higher than a UET at the center of the cell in order to compensate for the reduced antenna gain at the edge of the cell. By transmitting at the 3 dB higher transmission power level, the signal from the UET at the edge of the cell may be received at the satellite with a power that is approximately equal to the power of a signal from the UET at the center of the cell. In order to simplify and reduce the cost of uplink components installed on the satellite, it is desirable to maintain a similar received power level for each UET in the cell. Thus, it is desirable to modify the transmission power of each UET in the cell to compensate for any reduction in the antenna gain at each UET resulting from the UET's position within the cell.

2. Antenna Pointing Errors

In practice, the antenna beams of a cellular communication satellite are generally not directed precisely toward the centers of their assigned cells. Slight mis-orientations of the antenna boresights and deviations from a perfectly circular, zero-inclination satellite orbit give rise to pointing errors. These pointing errors may cause the location of the maximum gain of an antenna beam to deviate from the cell center. Some pointing errors may also cause the maximum gain of an antenna-beam pattern to change measurably over the course of a day. In other words, the antenna beam gain distribution across the cell may change with time.

The antenna beam gain at the edge of a cell typically rolls off rapidly as the distance from the center of the cell increases, that is, as the angular deviation from boresight increases. Thus, a pointing error corresponding to only 10% of a cell diameter may cause the antenna beam gain at the edge of a cell to vary by 2 dB or more. Because it is desirable to maintain a similar received power for each UET in the cell, it is desirable to adjust the transmission power of each UET in the cell to compensate for antenna beam pointing errors.

3. Atmospheric Attenuation

Achieving satisfactory communication performance for a signal transmitted from a UET to a satellite generally depends upon receiving a requisite level of signal power at the satellite. That is, each user terminal must transmit a signal with sufficient power to be received. The relationship between the power of the signal transmitted by the terminal and the power of the signal received by the satellite receiver depends in part upon the amount of attenuation of the signal as it passes through the earth's atmosphere. At Ka-band frequencies, the amount of atmospheric attenuation varies considerably as meteorological parameters and weather patterns change. In particular, the occurrence of rain has a pronounced effect on the attenuation of a Ka-band communication signal. The attenuation of the communication signal is known as rain loss or rain fade, although other meteorological phenomena may also provide attenuation. Such atmospheric conditions and/or weather patterns may change rapidly and may vary among different UETs in a cell depending upon the UET's position within the cell. Because it is desirable to maintain a similar received power for each UET in the cell, it is desirable to adjust the transmission power of each UET in the cell to compensate for the attenuation experienced by the UET's signal due to rain loss.

4. Co-Channel Interference

Immediately adjacent cells in a cellular satellite communication system typically use different frequencies for transmitting signals. However, non-adjacent cells may use the same frequency. Such frequency re-use among cells within a cellular pattern serves to reduce the overall frequency bandwidth necessary for the satellite communication system. However, imperfections in satellite antenna beams such as, for example, sidelobe generation, may cause signals transmitted from a UET located in a first cell to be received by a satellite antenna beam which is assigned to receive signals from UETs located in a second cell which uses the same frequency as the first cell. Signals transmitted by UETs located in different cells but using the same frequency may thus interfere with each other, and may cause degraded communication performance. That is, a desired signal received by the satellite from a first UET may be interfered-with by signals from other UETs in other cells using the same frequency as the first UET. The interference from the other UETs may interfere with the desired signal and may adversely affect the performance of the communication system. The interference from other UETs is often referred to at Co-Channel Interference (CCI).

The ratio of the signal power received from the desired UET to the background noise is known as the signal-to-background ratio (SBR). The number of errors in a data signal received from a UET at a satellite (i.e., the error count) may be impacted by the SBR. The background may include thermal and other noise sources as well as interference sources such as interference from other UETs using the same frequency. In order for the satellite to receive a signal from a particular UET, the transmission power of the UET must be sufficient to provide at least a certain desired minimum SBR. As the background portion of the SBR increases with increasing CCI, the signal portion of the SBR is also increased to maintain the desired SBR. That is, the UET of interest transmits with increased transmission power to maintain the desired SBR in light of the increasing interference from other UETs. However, increasing the transmission power of the UET of interest raises the background level for the other UETs. The other UETs, also seeking to maintain the desired SBR, in turn respond by raising their transmission powers. The UET of interest may react by further increasing its power, and so on until all terminals in the system are operating at the maximum transmission power. This phenomenon is known as system runaway.

Satellite systems have been proposed that attempt to address the problem of system runaway by establishing a single, constant transmission power level for each UET. These proposed systems contemplated using frequencies in the range of 3 to 12 GHz (C or Ku band). Maintaining a constant power for each UET may be acceptable at Ku or C band frequencies in some cases. However, at higher, Ka-band frequencies (20–30 GHz), for example, attenuation alone may cause the power of the received signals at the satellite to vary over a range of 20 dB or more. A comparable dynamic range would be required of the satellite demodulator, which would have a dramatic impact on system complexity and cost. Additionally, such a system would produce a high degree of CCI and increased power consumption. Because of the high CCI, the maximum tolerable interference level from other UETs would unduly limit the number of UETs that may be used, and system capacity would be needlessly limited. Therefore, it is desirable to maintain satisfactory communication performance (typically, maintain a desired SBR and/or a desired error count) while preventing system runaway.

Additional complexity arises in an uplink power control system with regard to UETs which transmit data intermittently rather than continuously, or whenever a UET first establishes a communication channel for transmission to the satellite. When a UET initiates a transmission, the UET may be forced to send an uplink signal into an attenuation and interference environment substantially unknown to the UET. That is, the UET may not be able to transmit initially with a transmission power that provides the desired SBR while not providing needless CCI to other UETs using the same frequency. If the initial transmission power is set too low, the signal may not be received by the satellite. If the initial transmission power is set too high, it may add a disproportionate amount of CCI and degrade the quality (adversely impact the SBR) of other uplink signals in the system.

A pending application entitled "Comprehensive System and Method for Uplink Power Control in a Satellite Communication System", application Ser. No. 09/596,683, filed Jun. 19, 2000, presented a method and means for controlling uplink transmission power in a satellite communication system to compensate for gain roll-off, antenna pointing errors, atmospheric attenuation, and co-channel interference. In operation, as shown in FIGS. 1 and 7, the uplink transmission power level used by a UET 110 for transmitting a traffic burst is continuously adjusted based on the number of errors detected and corrected for a prior traffic burst by the error detector/decoder 711 of a processing satellite 140. The success of the method depends upon the ability to determine a needed correction to the uplink transmission power for a traffic burst from a signal fidelity measurement made on a prior traffic burst. The method is therefore optimum only for systems utilizing a signaling scheme in which each UET transmits a large number of traffic bursts on a given assigned frequency channel and time slot. In this case, interference between UETs would vary slowly, and the transmission power level for a traffic burst may be reliably determined from a signal fidelity measurement made on a prior traffic burst. Some signaling schemes, however, may be characterized by large and rapid variations in interference between UETs. In the demand assigned multiple access (DAMA) signaling scheme, for example, a UET may be assigned a different frequency channel and time slot for each traffic burst to be transmitted, so that the level of interference experienced by any given traffic burst bears no relation to that experienced by any prior burst.

Since the frequency channel and time slot ("chanslot") assigned to a terminal for the transmission of traffic bursts may change from burst to burst in the demand assigned multiple access (DAMA) signaling scheme, it is not generally possible to determine the proper transmit power level for a traffic burst based on measurements of signal fidelity made on prior traffic bursts. It is therefore critical to overall system performance that the power leveling thresholds and traffic burst power offsets assume values which result in a high probability that the traffic bursts will be received by the satellite at or above a desired level of signal fidelity. At system turn-on, the thresholds and offsets may be assigned values based on theoretical analysis of expected system performance. In general, however, the optimum values of thresholds and offsets may not be known until the system is operational and the dependence of system performance upon these values may be observed. The values may be different for each beam due to differences in receiver electronics, and may change over the life of the system due to component degradation.

A technique for calibrating the values of thresholds and offsets used in uplink power control is desired which is based on observed system performance, which allows optimum values to be determined for each beam independently, and which automatically updates the values over the life of the system. This invention addresses these problems and provides a solution.

BRIEF SUMMARY OF THE INVENTION

The preferred embodiment is useful in a satellite communication system comprising a satellite arranged to receive data carried by an uplink signal having a received power and to make a comparison of the received power of at least a portion of the uplink signal with a power threshold. The system also comprises a UET equipped with a transmitter arranged to transmit the uplink signal at a transmit power adjusted at least in part in response to the comparison. In such an environment, the power threshold preferably is controlled by determining errors in the data and adjusting the power threshold in response to the determining of the errors. The determining of errors and adjusting preferably are carried out by one or more processors. By using the foregoing techniques, the power threshold can be effectively controlled in the presence of DAMA signaling.

By using the foregoing techniques, the system may provide self-calibration for maintaining a desired level of signal fidelity. Threshold values may be automatically adjusted based on direct observations of system performance. The system may compensate for degradation of receiver electronics components, and may react to changes in the average interference environment.

DETAILED DESCRIPTION OF THE PREFERRED EMBODIMENTS

The preferred embodiment of the present invention provides a system and method for controlling the power leveling threshold values and power offset values used for uplink power control in a satellite communication system which utilizes DAMA signaling. The power leveling threshold values are used for maintaining the received power of synchronization bursts and traffic bursts at a nearly constant level, and for establishing an uplink reference power level for an earth terminal. The power offset values are used for determining the uplink transmission power level for a traffic burst in the case that the type of digital coding employed when transmitting data in a traffic burst is different from the type of digital coding employed when transmitting a synchronization burst. That is, when a terminal prepares to transmit data in a traffic burst, the uplink transmission power level is determined by adding a power offset value to the uplink reference power level. The power offset value is preferably based on the type of digital coding employed for transmitting data in the traffic burst. As each traffic burst is received and decoded by the satellite, the number of errors detected and corrected for that traffic burst is determined. Periodically, the error counts for a number of traffic bursts are statistically analyzed. If the satellite communication system uses multiple beams to provide communication to a number of geographically distinct regions (or "cells") on the earth, a separate statistical analysis is preferably performed for each beam of the satellite. The power leveling threshold values for each beam and the power offset values for each type of digital coding employed are controlled based on the statistical analyses of the error counts. The statistical analyses are preferably performed by a network control center (NCC) located on the earth.

Figure 1:
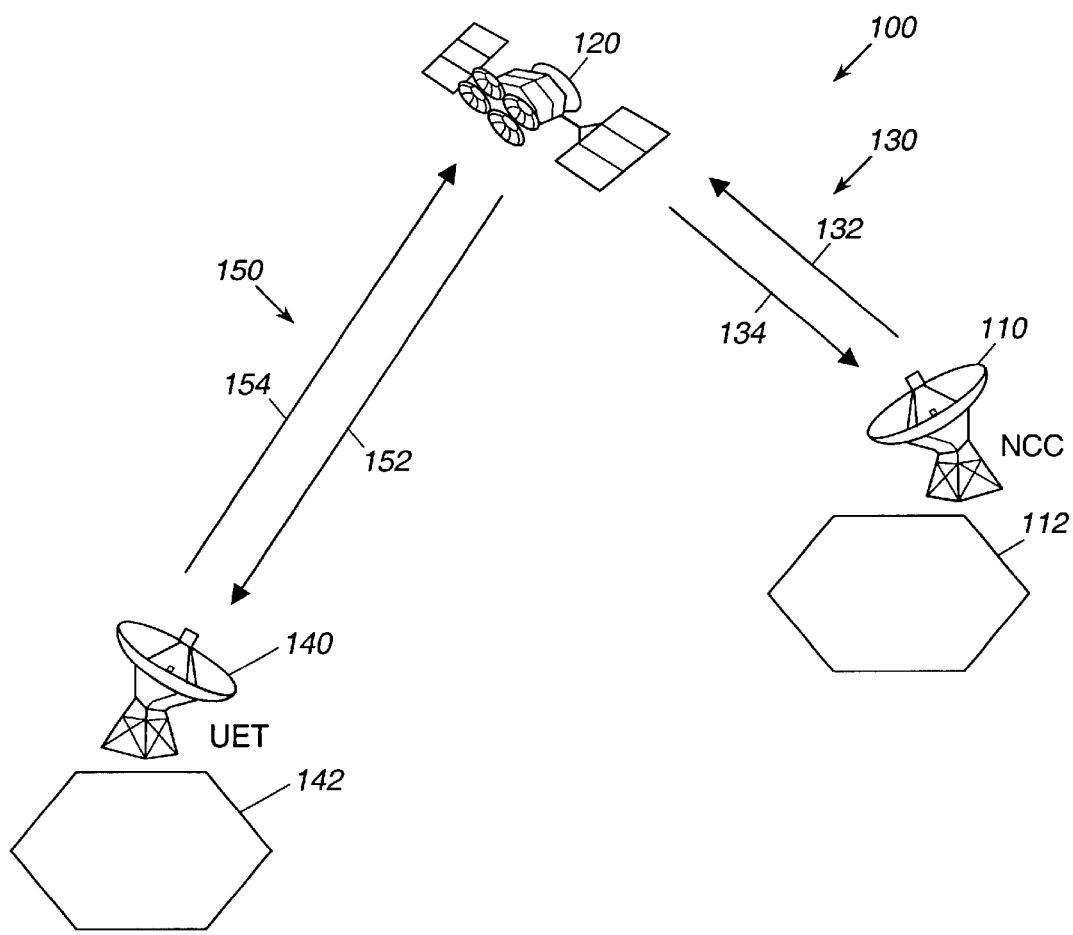
FIG. 1 illustrates a satellite communications system implementing threshold leveling according to a preferred embodiment of the present invention.

FIG. 1 illustrates a satellite communication system 100 implementing threshold leveling according to an embodiment of the present invention. The satellite communication system 100 includes a Network Control Center (NCC) 110 located in a NCC cell 112, a satellite 120, and a User Earth Terminal (UET) 140 located in a UET cell 142. The NCC 110 communicates with the satellite 120 via a NCC/Sat communication link 130. The NCC/Sat communication link 130 includes a NCC uplink 132 and a NCC downlink 134. The satellite 120 communicates with the UET 140 via a UET/Sat communication link 150. The UET/Sat communication link 150 includes a UET uplink 152 and a UET downlink 154.

In operation, signals may propagate from the NCC 110 to the satellite 120 via the NCC uplink 132 of the NCC/Sat communication link 130. Signals may also propagate from the satellite 120 to the NCC 110 via the NCC downlink 134 of the NCC/Sat communication link 130. Additionally, signals may propagate from the satellite 120 to the UET 140 via the UET downlink 154 of the UET/Sat communication link 150. Finally, signals may propagate from the UET 140 to the satellite 120 via the UET uplink 152 of the UET/Sat communication link 150.

Figure 2:
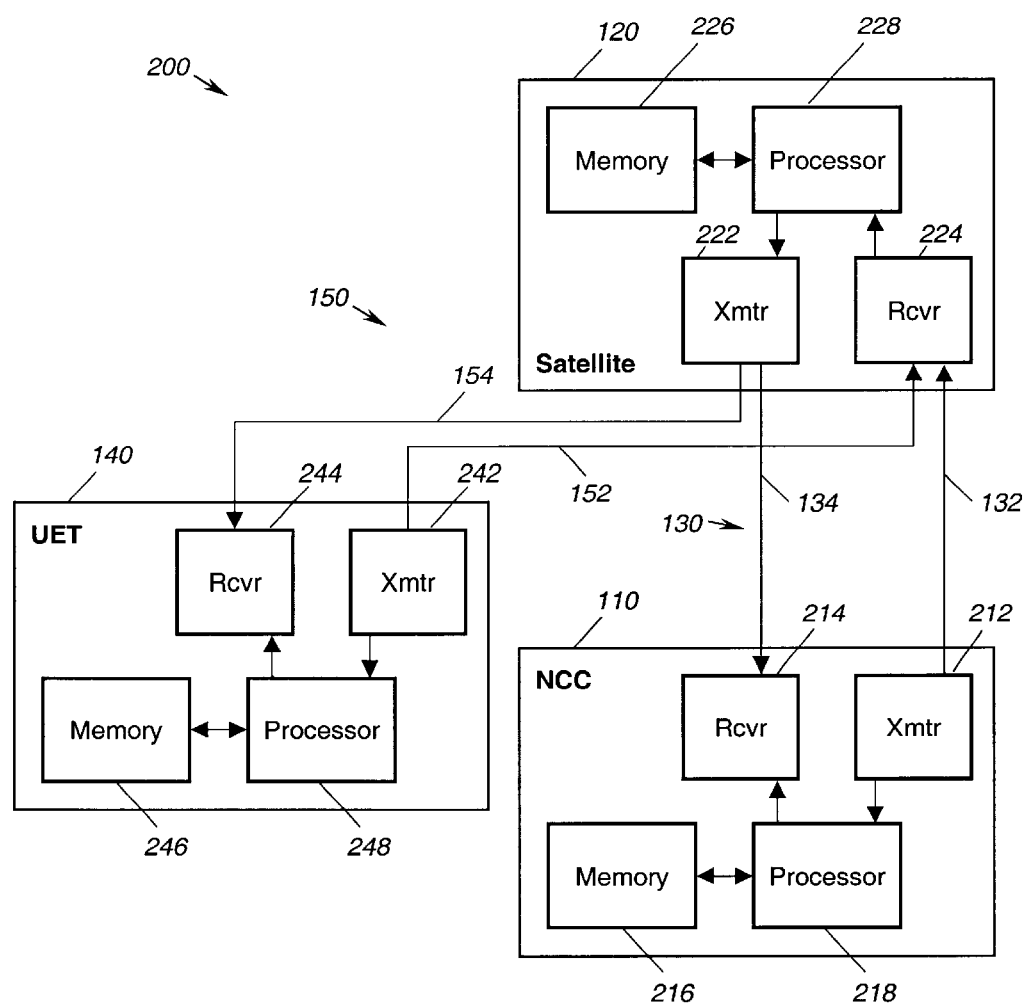
FIG. 2 illustrates a simplified block diagram of the satellite communication system shown in FIG. 1 according to a preferred embodiment of the present invention.

FIG. 2 illustrates a block diagram 200 of the satellite communication system 100 of FIG. 1, according to an embodiment of the present invention. The block diagram 200 includes the NCC 110, satellite 120, UET 140, NCC/Sat communication link 130, and UET/Sat communication link 150 of FIG. 1. The NCC 110 includes a NCC uplink transmitter 212, a NCC downlink receiver 214, a NCC memory 216, and a NCC processor 218. The satellite 120 includes a satellite downlink transmitter 222, a satellite uplink receiver 224, a satellite memory 226, and a satellite processor 228. The UET 140 includes a UET uplink transmitter 242, a UET downlink receiver 244, a UET memory 246, and a UET processor 248.

The satellite communication system preferably uses frequency division multiple access (FDMA) in combination with time division multiple access (TDMA) for allocating available communication resources, such that each UET within a given cell is assigned a frequency channel and one or more time slots for transmission of uplink signals. UETs located in adjacent cells may transmit uplink signals using different frequency channels, while UETs in nonadjacent cells may use the same frequency channels. Each channel/slot combination ("chanslot") is assigned to only one UET in a given cell for transmission of uplink signals, while each UET may be assigned one or more chanslots. Alternatively, the present invention may be implemented in many other types of satellite communication systems which use code division multiple access (CDMA), FDMA only, TDMA only, or any other combination of CDMA, FDMA, and/or TDMA. A preferred embodiment of the present invention is described in detail below in the context of a TDMA/FDMA system.

In operation, the UET uplink transmitter 242 of the UET 140 transmits a synchronization signal (or "synch burst") over a selected chanslot in the UET uplink 152 to the satellite 120. During the transmission, the UET uplink transmitter 242 transmits at a predetermined power level. The transmitted synch burst is received at the satellite uplink receiver 224 of the satellite 120. The satellite uplink receiver 224 then measures the energy level of the received synch burst to determine a received energy level measurement.

A predetermined power leveling threshold is stored in the satellite memory 226. Once the received energy level measurement has been determined at the satellite receiver 224, the received energy level measurement is passed to the satellite processor 228. The satellite processor 228 compares the energy level of the received signal to the power leveling threshold. The satellite processor 228 then determines a power adjustment signal for the UET uplink transmitter 222 based on the comparison of received energy level measurement with the power leveling threshold. The satellite processor 228 then sends the power adjustment signal to the UET 140 using the satellite downlink transmitter 222. The power adjustment signal propagates to the UET 140 over the UET downlink 154.

The UET downlink receiver 244 receives the power adjustment signal and forwards the power adjustment signal to the UET processor 248. The UET processor 248 processes the power adjustment signal and commands the UET uplink transmitter 242 to adjust its uplink synch burst transmit power. A system and method for adjusting the uplink transmit power of a UET is further described in U.S. patent application Ser. No.09/596,671, filed Jun. 19, 2000, entitled "Method and System for Controlling Uplink Power in a Satellite Communication System Using Power Leveling", the subject matter of which is incorporated in its entirety herein by reference. The preferred embodiment of this application illustrates an exemplary process of adjusting the uplink transmit power used by a UET for transmitting a synch burst based on an energy level measurement by the satellite of a prior received synch burst. This process is referred to herein as power leveling.

The uplink power leveling process operates to maintain the uplink power level of the UET uplink transmitter 242 at a level at which an associated received synch burst energy level at the satellite 120 is within a predetermined range of the power leveling threshold. As the power leveling process continues, the UET 140 stores its current uplink synch burst transmit power level as its "UET uplink reference power level" in the UET memory 246.

As the UET 140 prepares to initiate a data transmission to the satellite 120, the UET 140 is assigned one or more chanslots for the transmission of data signals (or "traffic bursts") over the uplink 152. The NCC 110 preferably performs the chanslot assignment. The uplink power level used by the UET 140 for transmitting traffic bursts in each assigned chanslot may be determined by adding a fixed power offset value to the UET uplink reference power level. The fixed offset value is stored in the UET memory 246 and typically depends on the type of digital coding employed for the transmission of data in a given chanslot. A satellite communication system which employs more than one type of digital coding for the transmission of traffic bursts may require that the UET 140 stores in its memory 246 a separate fixed offset value corresponding to each type of digital coding that differs from the type of coding employed for the transmission of synch bursts. If traffic bursts are transmitted using the same type of coding which is employed for the transmission of synch bursts (from which the UET uplink reference power level is derived), the offset value is typically zero. A satellite communication system which employs more than one type of digital coding for the transmission of traffic bursts is further described in U.S. patent application Ser. No. 09/163,775, filed Jul. 19, 2000, entitled "Adaptive Coding Scheme for a Processing Communication Satellite", the contents of which are incorporated herein by reference.

When a satellite communication system initially becomes operational, the power leveling thresholds stored in the satellite memory 226 and the power offsets stored in the UET memory 246 are typically assigned values based on expected system performance. In operation, however, the performance of the system may differ from expectation due to the unpredictable nature of background interference levels, the performance of digital decoding algorithms in an actual signal and interference environment, the performance of electronic components, and the degradation of these components over time. As a result, an undesired number of errors may be experienced when received data is decoded in the satellite processor 228. The preferred embodiment provides a method and means for maintaining the error rate of a received data stream at a desired level by automatically adjusting the power leveling threshold values and power offset values in response to an observed average error rate. In the case of a multi-beam satellite communication system, the preferred embodiment provides for a separate power leveling threshold value for each beam of the system to be maintained and automatically calibrated.

Figure 3:
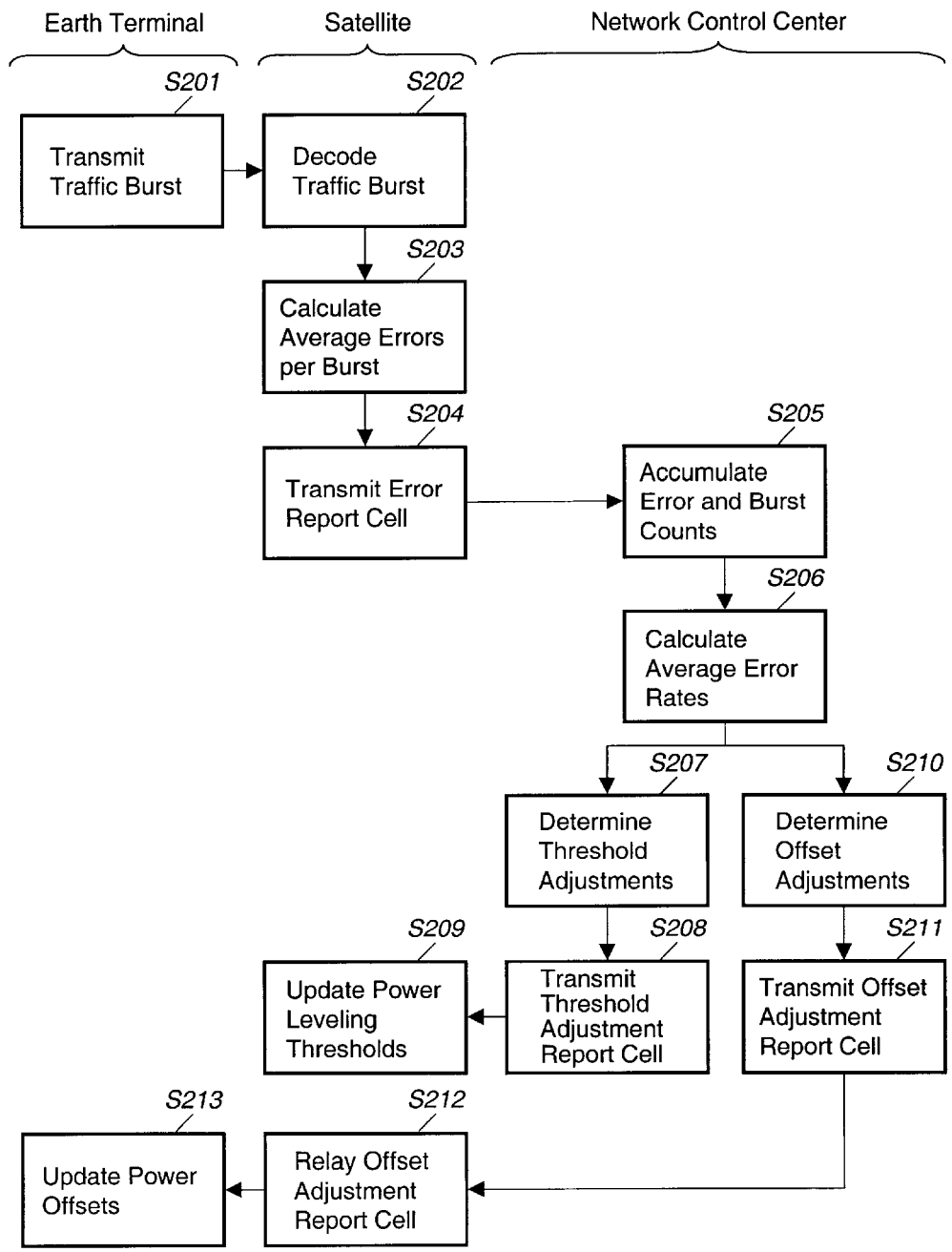
FIG. 3 is a flow chart illustrating a threshold leveling technique according to a preferred embodiment of the present invention.

FIG. 3 is a flow chart showing how the above-described power leveling feature may be combined with threshold leveling to provide a comprehensive uplink power control system according to a preferred embodiment of the invention. Basically, the preferred embodiment provides techniques for automatically calibrating the power leveling thresholds and traffic burst power offsets used in controlling the uplink power in multibeam satellite communication system 100 which utilizes DAMA signaling. The preferred technique involves the UET 140, satellite 120 and NCC 110.

The UET 140 determines the power level for transmitting a traffic burst by accessing the current uplink reference power value which is stored in the UET memory 246 and adding the power offset value, also stored in the UET memory 246, which corresponds to the type of digital coding to be used for transmitting the traffic burst. If the type of coding employed for the traffic burst is the same as the type of coding employed for the synchronization bursts, the offset value is typically zero, and the traffic burst is transmitted at the same power level as the synchronization bursts. If the type of coding to be employed for the traffic burst is different than the type of coding employed for the synchronization bursts, the transmit power level of the traffic burst differs from the transmit power level of the synchronization bursts by the amount of the offset value. The offset value is based on the performance characteristics of the particular types of coding employed for transmitting traffic bursts and synchronization bursts; a typical offset value may be 5 dB. If the system employs more than one type of coding for transmitting traffic bursts, the terminal may store in its memory a different offset value for each type of coding which may be employed. Once the transmit power level has been determined, the terminal transmits the traffic burst to the satellite as part of an uplink signal.

When the traffic burst is received by the satellite 120, it is decoded in the satellite processor 228 using an error-correcting decoder, such as a Reed-Solomon decoder. This standard decoder has the property of being able to correct a number of bit errors that may occur in the decoding of the received traffic burst due to the presence of noise and interference. For example, a (236, 212) Reed-Solomon decoder can correct up to 12 errors in each block of 236 received data bits. The decoder also provides a count of the number of errors identified and corrected for each block of data. The satellite decodes the traffic bursts for all chanslots in the current TDMA frame, sums the error counts for each beam, and divides by the number of decoded bursts for that beam to produce an average number of errors per burst for each beam. If the system employs more than one type of coding, separate error count and traffic burst totals are maintained for each group of chanslots pertaining to a given beam and coding type. The satellite then prepares report cells which contain the average error counts as well as the number of traffic bursts decoded for each group. The report cell may be implemented in the form of an Asynchronous Transfer Mode (ATM) cell. The satellite transmits the error report cells to the network control center (NCC 110) as part of a downlink signal.

As an example calculation of the number of ATM cells needed for the error report, a TDMA frame may contain 6000 chanslots which are available for transmitting traffic bursts. Four thousand of these chanstots may be assigned a coding scheme which requires four data blocks per traffic bursts while the remaining 2000 chanslots may be assigned a different coding scheme with a lower data rate which requires 8 data blocks per traffic burst to carry the same amount of information. The maximum number of errors which may be corrected by a (236, 212) Reed-Solomon decoder operating on a chanslot of the first type is 12×4=48, which can be encoded as 6 bits. The maximum number of chanslots used to transmit traffic bursts is 4000, which can be encoded as 12 bits. The error report for this coding type relevant to one beam may then be contained within 24 bits, or 3 bytes. The maximum number of errors which may be corrected by the decoder operating on a chanslot of the second type is 12×8=96, and the maximum number of bursts is 2000. This information may also be contained in 3 bytes. If the system is comprised of 50 beams, each of which employ the same coding and chanslot allocation schemes, then error counts are determined for 100 groups, and a total of 300 bytes would be sufficient to carry the error reports for all beams. Seven standard 53-byte ATM cells may be used for transmitting the error report to the network control center in each TDMA frame, assuming each ATM cell is comprised of 9 bytes in which to store header information and 44 bytes in which to store data.

The network control center 110 receives the error report cells and extracts the error counts and traffic burst counts for each group. The total number of errors corrected for each group over the TDMA frame is recovered by processor 218 which finds the product of the number of traffic bursts and the number of errors per traffic burst. The total number of errors and the number of traffic bursts for each group are stored in memory 216 of the network control center.

With each new TDMA frame, the total number of errors and number of traffic bursts for each group are added to the values stored in memory 216 from previous TDMA frames until a target number of decoded traffic bursts for a given group is surpassed. The target number of traffic bursts may typically be on the order of $10^6$, and counts of a given group may be accumulated for a period of time extending from one to several hours, depending on the level of traffic in the system. The total error count is then divided by the total number of bursts by processor 218 to determine an average burst error rate for the corresponding group. The network control center 110 determines a power adjustment based on the average burst error rate calculated for a given group. In the preferred embodiment, this may be implemented by means of a look-up table T1 which contains as entries a set of burst error rates and a corresponding set of power adjustments. Separate look-up tables T2, T3, . . . may be stored for each type of coding employed for the transmission of traffic bursts. If the power adjustment pertains to the same type of coding as is used for transmitting synchronization bursts, the power adjustment is applied as an adjustment to the power leveling threshold that is stored in the memory 226 of the satellite (FIG. 2). The threshold adjustment is placed in a report cell along with an indication of the beam for which the adjustment was determined. The network control center 110 transmits the threshold adjustment report cell as part of an uplink signal to satellite 120, which extracts the adjustment and uses it to update the threshold value of the relevant beam. If the power adjustment pertains to a different type of coding than is used for transmitting synchronization bursts, the power adjustment is applied as an adjustment to a power offset that is stored in the memories (e.g., 246) of all terminals within the relevant beam. The offset adjustment is placed in a report cell along with an indication of the type of coding to which the adjustment pertains. The network control center 110 transmits the offset adjustment report cell as part of an uplink signal to the satellite 120, which relays the cell to all terminals (e.g., UET 140) within the relevant beam. Upon receiving the cell, a terminal extracts the adjustment and uses it to update the offset value corresponding to the relevant type of coding.

By periodically updating the values of the power leveling thresholds and power offsets based on average error rates observed for all earth terminals within a beam, the system can maintain the transmit power levels of the earth terminals so as to provide a nearly constant average signal fidelity throughout the system. Determining threshold and offset adjustments on a beam-by-beam basis allows the system to compensate individually for differential component degradation in satellite receiver 224 electronics and for geographically based differences in the interference environment. Since the update rate for these adjustments increases as the amount of traffic increases, the system is capable of reacting dynamically to changes in the interference environment caused by changing traffic levels.

According to another embodiment, all of the functions carried out by the network control center 110 could be accomplished on board satellite 120. The preferred embodiment employs network control center 110 for these functions because they provide an efficient means of monitoring the overall performance of the system or the performance of an individual beam by a system operator. In addition, delegating these tasks to the network control center provides the system operator with a greater degree of ease and flexibility in determining threshold and offset adjustments, as well as their update rates.

FIG. 3 is a flow diagram illustrating the general sequence of steps associated with the threshold leveling technique. In step S201, an earth terminal transmits a traffic burst to the satellite. In step S202, the satellite decodes the traffic burst using an error-correcting decoder, such as the Reed-Solomon decoder. The error-correcting decoder provides a count of the number of errors corrected for each block of data. In step S203, the satellite groups the error counts of all chanslots in the current TDMA frame by beam and by type of coding, and sums the error counts to produce a total number of corrected errors for each group. The satellite then divides each sum by the number of traffic bursts decoded for the corresponding group to produce an average number of errors per traffic burst for each group. In step S204, the satellite prepares report cells containing the average number of errors and the number of traffic bursts decoded for each group in the TDMA frame and transmits the report cells to the network control center 110.

In step S205, the network control center receives the error report cells over many TDMA frames and keeps running totals of the number of errors corrected and the number of traffic bursts for each group. In step S206, as the total n umber of traffic bursts for a given group exceeds a threshold value, the network control center calculates an average burst error rate for the relevant group by dividing the total number of errors by the total number of traffic bursts.

In step S207, an adjustment to a power leveling threshold for a given beam is determined by using an average burst error rate which pertains to the same type of coding employed by the satellite for transmitting synchronization bursts. The adjustment may be determined by means of a look-up table T1 which relates a given number of errors to a threshold adjustment. In step S208, the network control center prepares a report cell containing the threshold adjustment and transmits the report cell to the satellite. In step S209, the satellite 120 receives the report cell, extracts the threshold adjustment, and applies the adjustment to the power leveling threshold value which is stored in memory 226 for the relevant beam.

In step S210, an adjustment to a power offset value for a given beam is determined using an average burst error rate which pertains to a different type of coding than is employed by the satellite for transmitting synchronization bursts. The adjustment may be determined by means of a look-up table T2 which relates a given number of errors to an offset adjustment. A different look-up table may be implemented for each type of coding employed by the satellite. In step S211, the network control center prepares a report cell containing the offset adjustment and transmits the report cell to the satellite 120. In step S212, the satellite receives the report cell and relays it to all earth terminals in the relevant beam. In step S213, an earth terminal (e.g., UET 140) receives the report cell, extracts the offset adjustment, and applies the adjustment to the power offset value which is stored in memory (e.g., 246) for the relevant type of coding.

Terminal UET 140 then uses the reference power value to transmit bursts of data to satellite 120. The power offset value may be combined with the reference power value depending of the type of coding used with the burst. For example, if the synchronization bursts use light coding, whereas the traffic bursts use heavy coding, the reference power value is used alone to determine the power of the synchronization bursts when they are transmitted. However, when the traffic bursts are transmitted, the power offset value is added to the reference power value in order to determine the transmission power.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features which come within the spirit and scope of the invention. For example, signal energy rather than signal power could be used in the preferred embodiment.

What is claimed is:

1. In a satellite communication system, comprising a satellite arranged to receive data carried by an uplink signal having a received power and to make a comparison of the received power of at least a portion of said uplink signal with a power threshold, said system also comprising a user earth terminal equipped with a transmitter arranged to transmit said uplink signal at a transmit power adjusted at least in part in response to said comparison, a method for controlling the threshold comprising:

determining errors in said data;

adjusting said power threshold in response to said determining of said errors; and adjusting said transmit power at least in part in response to said determining errors in said data;

wherein said transmit of said uplink signal at a transmit power comprises transmit at a transmit power comprising a reference power combined with an offset power and wherein said adjusting said transmit power comprises adjusting said offset power.

2. A method, as claimed in claim 1, wherein said data comprises a first type of data and a second type of data and wherein said adjusting said offset power comprises adjusting said offset power to a first value in response to said first type of data and adjusting said offset power to a second value in response to said second type of data.

3. A method, as claimed as claim 1, wherein said adjusting said offset power comprises addressing a look up table.

4. A method, as claimed in claim 1, wherein said determining errors comprises:

determining error counts of said errors;

determining an average error rate in response to said error counts; and adjusting said power threshold in response to said average error rate.

5. In a satellite communication system comprising a satellite arranged to receive data carried by an uplink signal having a received power and to make a comparison of the received power of at least a portion of said uplink signal with a power threshold, said system also comprising a user earth terminal equipped with a transmitter arranged to transmit said uplink signal at a transmit power adjusted at least in part in response to said comparison, a method for controlling the threshold comprising:

determining errors in said data; and adjusting said power threshold in response to said determining of said errors;

wherein said determining errors comprises determining error counts of said errors, determining an average error rate in response to said error counts, and adjusting said power threshold in response to said average error rate;

wherein said uplink signal comprises transmit of a plurality of data signals and wherein determining an average error rate comprises:

determining a total number of errors by summing said error counts for said plurality of data signals; and dividing the total number of errors by the number of data signals in said plurality of data signals.

6. In a satellite communication system comprising satellite arranged to receive data carried by an uplink signal having a received power and to make a comparison of the received power of at least a portion of said uplink signal with a power threshold, said system also comprising a user earth terminal equipped with a transmitter arranged to transmit said uplink signal at a transmit power adjusted at least in part in response to said comparison, a method for controlling the threshold comprising:

determining errors in said data; and adjusting said power threshold in response to said determining of said errors;

wherein said transmit of said uplink signal comprises transmit of a synchronization signal and transmit of a data signal carrying said data and wherein said comparison is made using said synchronization signal.

7. In a satellite communication system comprising a satellite arranged to receive data carried by an uplink signal having a received power and to make a comparison of the received power of at least a portion of said uplink signal with a power threshold, said system also comprising a user earth terminal equipped with a transmitter arranged to transmit said uplink signal at a transmit power adjusted at least in part in response to said comparison, apparatus for controlling the threshold comprising one or more processors arranged to determine errors in said data and to adjust said power threshold in response to said determined errors;

wherein said one or more processors further are arranged to adjust said transmit power at least in part in response to said determined errors; and wherein said transmitter also is arranged to transmit said uplink signal at a transmit power comprising a reference power combined with an offset power and wherein said one or more processors are arranged to adjust said offset power in response to said determined errors.

8. Apparatus, as claimed in claim 7, wherein said data comprises a first type of data and a second type of data and wherein said one or more processors are arranged to adjust said offset power to a first value in response to said first type of data and to adjust said offset power to a second value in response to said second type of data.

9. Apparatus, as claimed in claim 7, wherein said one or more processors are arranged to adjust said offset power by addressing a look up table.

10. In a satellite-communication system comprising a satellite arranged to receive data carried by an uplink signal having a received power and to make a comparison of the received power of at least a portion of said uplink signal with a power threshold, said system also comprising a user earth terminal equipped with a transmitter arranged to transmit said uplink signal at a transmit power adjusted at least in part in response to said comparison, apparatus for controlling the threshold comprising one or more processors arranged to determine errors in said data and to adjust said power threshold in response to said determined errors;

wherein said one or more processors are arranged to determine error counts of said errors, determine an average error rate in response to said error counts, and adjust said power threshold in response to said average error rate;

wherein said uplink signal comprises a plurality of data signals and wherein said one or more processors are arranged to:

determine a total number of errors by summing said error counts for said plurality of data signals; and divide the total number of errors by the number of data signals in said plurality of data signals.

11. In a satellite communication system comprising a satellite arranged to receive data carried by an uplink signal having a received power and to make a comparison of the received power of at least a portion of said uplink signal with a power threshold, said system also comprising a user earth terminal equipped with a transmitter arranged to transmit said uplink signal at a transmit power adjusted at least in part in response to said comparison, apparatus for controlling the threshold comprising one or more processors arranged to determine errors in said data and to adjust said power threshold in response to said determined errors;

wherein said transmitter is arranged to transmit a synchronization signal and to transmit a data signal carrying said data and wherein said comparison is made using said synchronization signal.

* * * * *